(12) United States Patent
Agapiou

(10) Patent No.: US 12,525,858 B2
(45) Date of Patent: Jan. 13, 2026

(54) METHOD OF IMPROVING LAMINATION STACK FLATNESS AND CONCENTRICITY

(71) Applicant: GM GLOBAL TECHNOLOGY OPERATIONS LLC, Detroit, MI (US)

(72) Inventor: John S. Agapiou, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 222 days.

(21) Appl. No.: 18/455,761

(22) Filed: Aug. 25, 2023

(65) Prior Publication Data

US 2025/0070628 A1 Feb. 27, 2025

(51) Int. Cl.
  B29C 65/00    (2006.01)
  H02K 15/021   (2025.01)
  B29C 65/48    (2006.01)
  B29C 65/56    (2006.01)

(52) U.S. Cl.
  CPC ............ H02K 15/021 (2025.01); *B29C 65/48* (2013.01); *B29C 65/561* (2013.01)

(58) Field of Classification Search
  CPC ...... B29C 65/48; B29C 65/561; H02K 15/021
  See application file for complete search history.

(56) References Cited

U.S. PATENT DOCUMENTS

| | | | |
|---|---|---|---|
| 5,649,349 | A | 7/1997 | Greenway |
| 10,476,348 | B2 | 11/2019 | Mankame et al. |
| 10,630,151 | B2 | 4/2020 | Agapiou et al. |
| 11,675,012 | B2 | 6/2023 | Lesperance et al. |
| 2019/0292060 | A1 | 9/2019 | Wang |
| 2020/0368969 | A1 | 11/2020 | Wang et al. |

FOREIGN PATENT DOCUMENTS

DE    102012017293 A1    2/2014

OTHER PUBLICATIONS

Agapiou, John S. et al., U.S. Appl. No. 17/886,943, filed Aug. 12, 2022 entitled "Method for Stator Alignment to the Motor Housing," 38 pages.

Smith, Mark A. et al., U.S. Appl. No. 17/680,578, filed Feb. 25, 2022 entitled "Interlocking Tool for Forming Stator Winding End Turns," 24 pages. (P101323).

(Continued)

*Primary Examiner* — Philip C Tucker
*Assistant Examiner* — Nickolas R Harm

(57) ABSTRACT

A method of forming a stack of laminates for a stator includes stamping in sequence a plurality of annular stator laminates from a continuous sheet of metal. The annular stator laminates each including an interior surface with a plurality of winding teeth and an exterior surface with a plurality of circumferentially spaced radially protruding ears wherein the plurality of circumferentially spaced radially protruding ears of each adjacently formed annular stator laminate is circumferentially offset from the circumferentially spaced radially protruding ears of immediately adjacent annular stator laminates. Clocking each of the annular stator laminates a predetermined angular rotation relative to an adjacent annular stator and stacking the annular stator laminates with the circumferentially spaced radially protruding ears aligned within the stack.

20 Claims, 3 Drawing Sheets

(56) References Cited

OTHER PUBLICATIONS

Agapiou, John S. et al., U.S. Appl. No. 18/101,395, filed Jan. 25, 2023 entitled "Method to Produce Electric Motor Conductor Wires for High Frequency," 19 pages.
Hao, Lei et al., U.S. Appl. No. 18/312,029, filed May 4, 2023 entitled "Electric Motor Using Ultra-Conducting Copper," 29 pages.
Fatemi, Alireza et al., U.S. Appl. No. 17/883,887, filed Aug. 9, 2022 entitled "Rotor for an Electric Machine," 27 pages.
Gilliam, Mary et al., U.S. Appl. No. 18/084,216, filed Dec. 19, 2022 entitled "Rotor for Reluctance Machine and Method of Manufacturing the Same," 40 pages.
Office Action dated Jul. 16, 2024 from German Patent Office for German Patent No. 10 2023 133 116.7; 5pgs.

METHOD OF IMPROVING LAMINATION STACK FLATNESS AND CONCENTRICITY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to stator laminate stacks for electric motors and more particularly to a method of improving lamination stack flatness and concentricity.

Stator laminates are commonly stamped from a continuous sheet of metal. Although it is formed with desired tolerances, the continuous sheet of metal can nonetheless include variations in thickness across a width of the sheet. The variation in thickness can lead to the stator laminates having varying thickness along sides of the laminates. When stacked, the variation of the steel lamination sheet thickness throughout the length and across the coil width affects the flatness of the lamination stack. For example, if the left side of the coil strip was consistently thicker than the right side, the stator stacks produced would lose their perpendicularity and flatness (and would lean to the right). The present application is directed to improving lamination stack flatness and concentricity.

A stator stack is formed by stacking laminations into a pack. Using progressive die stamping of stator and rotor laminations is a cost-effective method for medium to high volume production. A careful design of dies will ensure optimum performance. A progressive die performs a series of operations in multiple stages in the die during each press stroke. These simultaneous operations produce parts from a strip of material that moves through the die. Each working stage performs one or more die operation, but the strip must move from the first stage through each succeeding stage to produce a complete stator and/or rotor laminations.

The current process assembles individual lamination stacks that are the sub-stacks. Then the operator will assemble four sub-stacks while rotated during stacking to create the 4 rotations.

The flatness of the surface of the current assembly method was too high (up to 0.36 mm) for both, the stator cores and the assembled stators.

The true position for the lamination stack ID (inside diameter) to the reference datum was too high up to ¼ millimeter.

The results from the data collected indicate that the top surface profile and relation of ID to OD are of concern. Therefore, it is desirable to reduce the variation of flatness and ID true-position to improve the assembly of the stator in the housing

SUMMARY

According to an aspect of the present disclosure, a method of forming a stack of laminates for a stator includes stamping in sequence a plurality of preliminary annular stator laminates from a continuous sheet of metal. The preliminary annular stator laminates each include an interior surface with a plurality of winding teeth and an exterior surface with a plurality of sets of circumferentially spaced radially protruding ears. All but one of the sets of equally spaced radially protruding ears are trimmed from each annular stator laminate while each preliminary annular stator laminate has a remaining set of equally spaced radially protruding ears that is circumferentially offset from a remaining set of equally spaced radially protruding ears of immediately adjacent annular stator laminates. Each of the annular stator laminates are clocked a predetermined angular rotation relative to an adjacent annular stator laminate and the annular stator laminates are stacked with the sets of equally spaced radially protruding ears aligned within the stack.

According to a further aspect, the plurality of sets of circumferentially spaced radially protruding ears include at least two sets of circumferentially spaced radially protruding ears and up to four sets of circumferentially spaced radially protruding ears.

According to a further aspect, the plurality of sets of circumferentially spaced radially protruding ears each include at least three circumferentially spaced radially protruding ears per set.

According to a further aspect, clocking each of the annular stator laminates a predetermined angular rotation relative to an adjacent annular stator includes clocking at least 22.5 degrees relative to an adjacent annular stator.

According to a further aspect, clocking each of the annular stator laminates a predetermined angular rotation relative to an adjacent annular stator includes clocking at least 30 degrees relative to an adjacent annular stator.

According to a further aspect, clocking each of the annular stator laminates a predetermined angular rotation relative to an adjacent annular stator includes clocking at least 45 degrees relative to an adjacent annular stator.

According to a further aspect, each of the plurality of sets of circumferentially spaced radially protruding ears include at least three ears.

The method according to claim 7, wherein each of the plurality of sets of circumferentially spaced radially protruding ears include at least four ears.

According to another aspect, a method of forming a stack of laminates for a stator includes stamping in sequence a plurality of annular stator laminates from a continuous sheet of metal, the annular stator laminates each including an interior surface with a plurality of winding teeth and an exterior surface with a plurality of circumferentially spaced radially protruding ears, wherein the plurality of circumferentially spaced radially protruding ears of each adjacently formed annular stator laminate is circumferentially offset from the circumferentially spaced radially protruding ears of immediately adjacent annular stator laminates. Each of the annular stator laminates are clocked a predetermined angular rotation relative to an adjacent annular stator and the annular stator laminates are stacked with the circumferentially spaced radially protruding ears aligned within the stack.

According to a further aspect, the plurality of circumferentially spaced radially protruding ears include at least three ears.

According to a further aspect, the plurality of circumferentially spaced radially protruding ears include at least four ears.

According to a further aspect, each of the annular stator laminates is clocked a predetermined angular rotation relative to an adjacent annular stator includes clocking at least 22.5 degrees relative to an adjacent annular stator.

According to a further aspect, each of the annular stator laminates is clocked a predetermined angular rotation relative to an adjacent annular stator includes clocking at least 30 degrees relative to an adjacent annular stator.

According to a further aspect, each of the annular stator laminates is clocked a predetermined angular rotation relative to an adjacent annular stator includes clocking at least 45 degrees relative to an adjacent annular stator.

According to a further aspect, a segmented blank/punch is used to blank the ears progressively at multiple locations on the lamination perimeter.

According to a further aspect, the segmented blank/punch includes at least two sets of a plurality of punches.

According to a further aspect, the at least two sets of a plurality of punches each include at least three punches.

According to a further aspect, the at least three punches of a first set of the at least two sets of a plurality of punches are spaced at equal intervals from one another.

According to a further aspect, the at least three punches of a second set of the at least two sets of a plurality of punches are spaced at equal intervals from one another and spaced from the first set of the at least two sets of a plurality of punches.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 2:
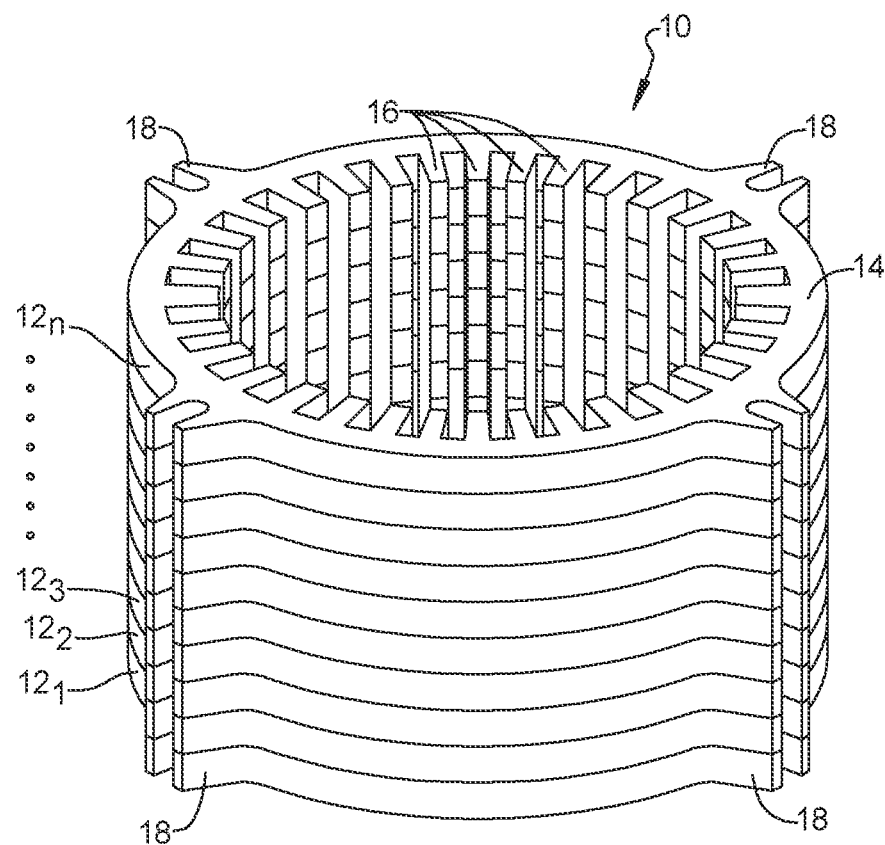
FIG. 2 is a perspective view of a stack of stamped stator laminations.

The present disclosure provides a method that minimizes the thickness variation and improves the flatness of a stator lamination stack. With reference to FIG. 2, an exemplary stator lamination stack 10 of an electric motor is shown including a plurality of stator laminations 12 each including an annular body 14 having an interior surface with a plurality of stator teeth 16 and an exterior surface with a plurality of radially outwardly protruding locating ears 18. The locating ears 18 are configured to engage longitudinal locating slots in a housing of the electric motor in order to secure the stator lamination stack 10 within the motor housing. Stator lamination stack 10, as shown, is generally known in the art. Typically, three or four locating ears 18 have been used on each of the stator laminations 12. The total number of stator laminates 12 used in a particular motor application depends upon the desired motor application.

Figure 1:
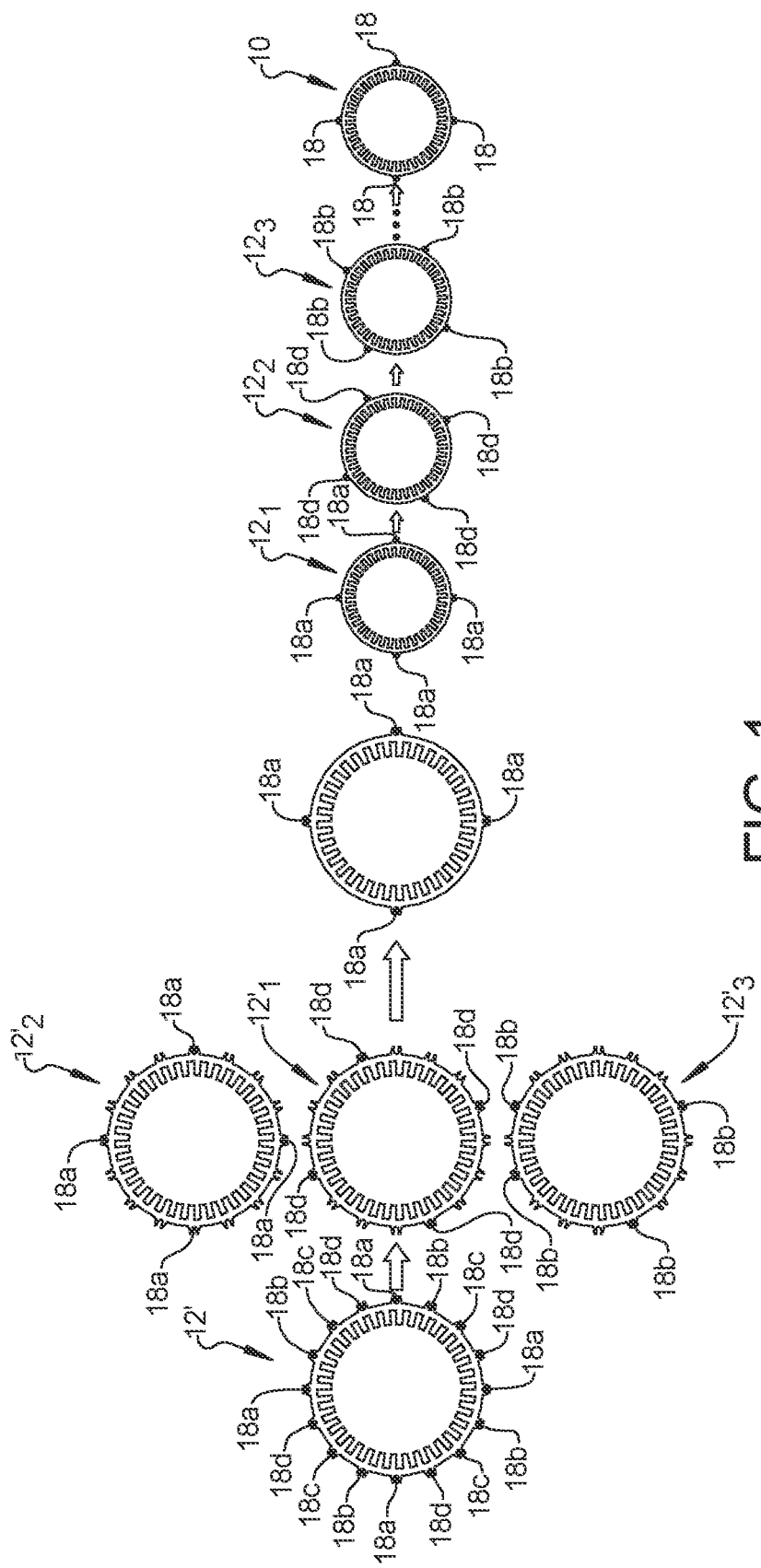
FIG. 1 is a schematic illustration of a series of stamped stator laminations having ears taken from different lateral portions of a continuous sheet of sheet metal.

With reference to FIG. 1, a method of forming the stator lamination stack according to the principles of the present disclosure will now be described. With reference to FIG. 1, an exemplary preliminary stamped stator laminate 12' is shown including an annular body 14 having an interior surface with a plurality of stator teeth 16 and an exterior surface with a plurality of sets of radially outwardly protruding locating ears 18a, 18b, 18c and 18d. In the example embodiment shown in FIG. 1, each of the plurality of sets of radially outwardly protruding locating ears 18a, 18b, 18c and 18d include four ears each (thus, in the embodiment shown in FIG. 1, sixteen (16) locating ears 18 are shown), although it should be understood that each set could include more or fewer locating ears. With sixteen locating ears 18a, 18b, 18c, 18d, each locating ear is spaced at 22.5 degrees from one another. During the method of forming, a series of preliminary stamped stator laminates 12' (three of which are shown $12'_1, 12'_2, 12'_3$) are formed. The preliminary stamped stator laminates $12'_1, 12'_2, 12'_3, \ldots, 12'_n$ are maintained in their original rotational orientation and all of the sets of radially outwardly protruding ears 18a, 18b, 18c and 18d are removed except for one set in order to form the final stator laminations 12. For each successive stator laminate $12_1, 12_2, 12_3, \ldots, 12_n$, a different one of the sets of ears 18a, 18b, 18c and 18d are maintained for the final stator laminate 12. For example, the set of ears 18a are maintained for a first stator laminate $12_1$, the set of ears 18b are maintained for a second stator laminate $12_2$, the set of ears 18c are maintained for a third stator laminate $12_3$, the set of ears 18d are maintained for a fourth stator laminate $12_4$, and the cycle is repeated for each subsequent subset of four stator laminates. The stator laminates $12_1, 12_2, 12_3, \ldots, 12_n$ are then stacked in sequence while each successive stator laminate is rotationally "clocked" relative to a preceding adjacent stator laminate 12. In the embodiment shown in FIG. 1, each subsequent stator laminate 12 can be "clocked" by 22.5 degrees (or a multiple of 22.5 degrees) relative to a preceding adjacent stator laminate in order to bring the respective remaining ear sets 18a, 18b, 18c and 18d of the stator laminates into alignment. By continuously clocking each successive stator laminate relative to the preceding stator laminate, any thickness variations in the continuous sheet of sheet metal used to make the stator stampings are rotationally evenly distributed around a circumference of the stator laminate stack 10 in order to provide a more uniform thickness stator laminate stack 10. Stated another way, blanking multiple ears during the shearing stage of the stator OD and then trimming the extra ears, allows for smaller angular rotation of the laminations within the stack to distribute the thickness variation more uniformly throughout the full stack.

Figure 3:
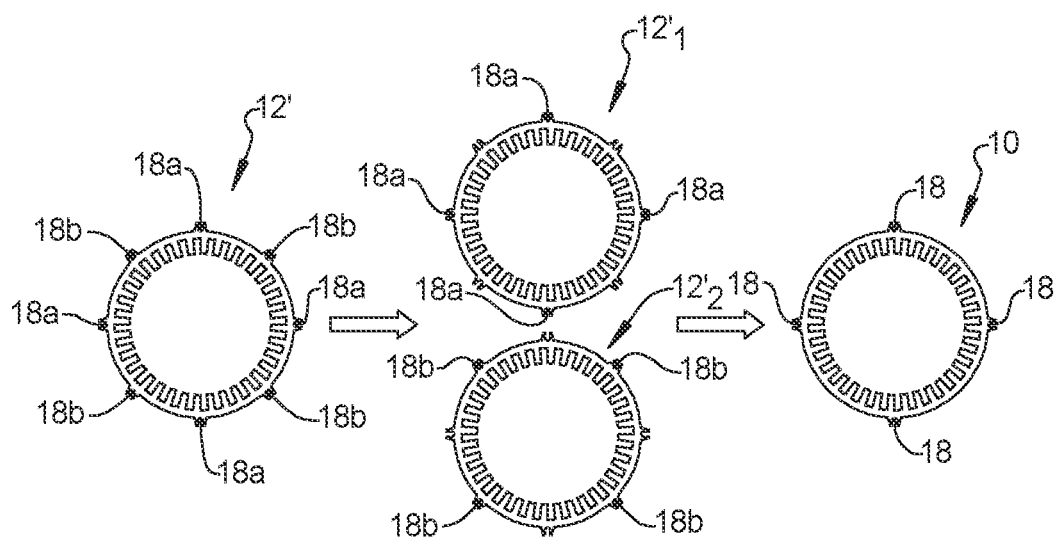
FIG. 3 is a schematic illustration of a series of stamped stator laminations having ears taken from different lateral portions of a continuous sheet of sheet metal according to an alternative method.

It should be understood that by using more or fewer ear sets 18a, 18b, 18c and 18d, that are removed in the manner discussed above, the amount that each subsequent stator laminate 12 can be clocked can be varied. In particular, for a preliminary stator laminate with three sets 18a, 18b, 18c of four ears a total of 12 ears 18 would be provided on the preliminary stator laminate and each ear 18 would be separated by 30 degrees. Then, only two sets of the ears 18a, 18b, 18c would be removed from each successive preliminary stator laminate and the process would be repeated for every three stator laminates. For this example, a rotational "clocking" distance of 30 degrees is achieved used for allowing the stack to distribute the thickness variation uniformly throughout the full stack. Likewise, as shown in FIG. 3, using two sets of ears 18a, 18b for a total of eight ears (spaced at 45 degrees) on the preliminary stator laminates 12' will allow the removal of one set and a rotational "clocking" distance 45 degrees.

Figure 4:
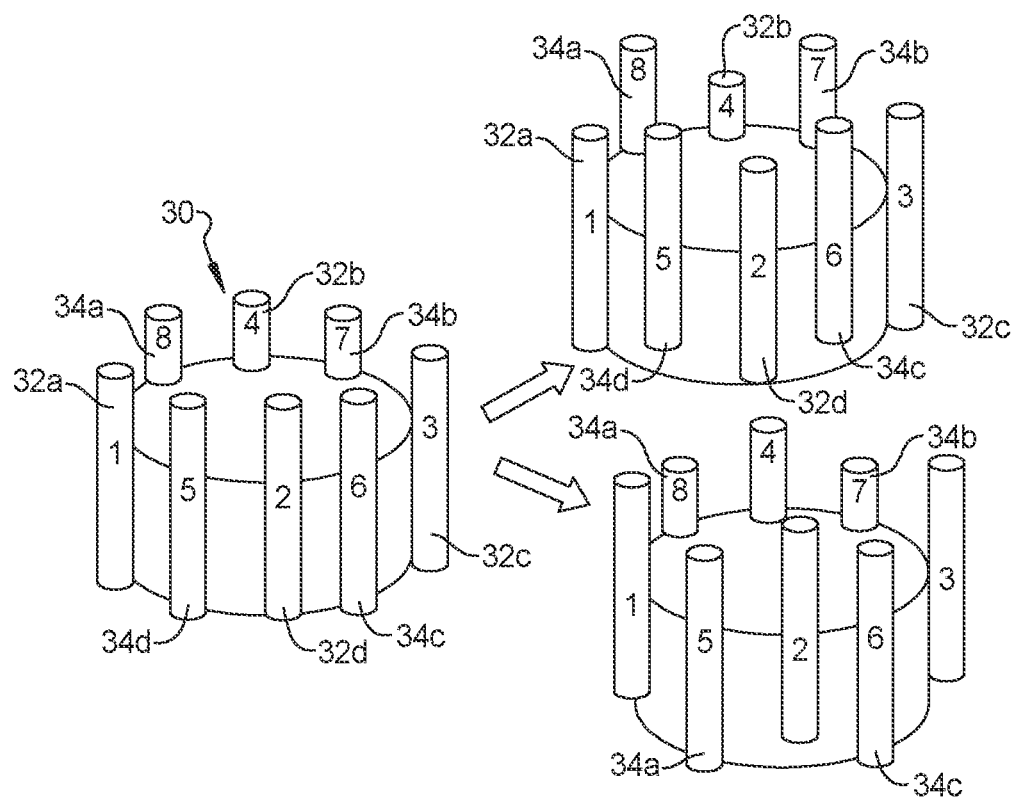
FIG. 4 is a schematic illustration of an example stamping device employed to perform the method depicted in FIG. 3.

In the previously described process, a preliminary stator laminate is formed with extra sets of ears. Select sets of the extra ears are then removed from the preliminary stator laminate to allow for sequential clocking of the stator laminates to evenly distribute thickness variations around the final stator laminate stack 10. Alternatively, as schematically shown in FIG. 4, a segmented blank/punch 30 could be also utilized to blank the four ears 18 progressively at multiple locations on the lamination perimeter. In the example shown, the segmented blank punch includes two sets of four punches 32a-32d, 34a-34d. A first set of four punches 32a-32d can be employed to form four ears 18 each spaced at 90 degree intervals from one another. A second set of four punches 34a-34d are spaced at 90 degree intervals from one another and spaced from the first set of four punches at forty five degree intervals. Thus, for every other stator laminate 12 formed, the ears 18 are circumferentially spaced at 45 degree intervals form the preceding and subsequently formed stator laminate 12. This 45 degree interval allows each subsequent stator laminate 12 to be "clocked" by 45 degrees or a multiple of 45 degrees relative to the preceding stator laminate 12 to distribute the thickness variation more uniformly throughout the full stack.

According to a still further embodiment, the die blanking/punching the ears 18 can rotate the blanks to properly generate the laminations with a desired number of ears (typically 3 or 4) that are angularly oriented offset from the previous lamination by a specified angular orientation of 30 or 22.5 degrees, respectively. In this case, the outer section of the die making the ears 18 rotates around the lamination yoke (the outer cylindrical part of the lamination) to relocate the ears at 30 or 22.5 degrees from the previous lamination. The system can use a gear or belt driven system to rotate the outer die section relative to the inner section making the lamination.

Thus, for stator laminates 12 formed according to this example, with a first stator laminate $12_1$ serving as a baseline a second stator laminate $12_2$ can be formed with ears 18 offset by 45 degrees so that the second stator laminate $12_2$ can be clocked 45 degrees relative to the first stator laminate. A third stator laminate $12_3$ can be sequentially formed the same way as the first stator laminate $12_1$, but clocked 90 degrees relative to the first laminate $12_1$ when it is added to the stack. A fourth laminate $12_4$ can be sequentially formed the same way as the second stator laminate $12_2$, but clocked 90 degrees relative to the second laminate $12_2$ when it is added to the stack. A fifth stator laminate $12_5$ can be sequentially formed the same way as the first stator laminate $12_1$, but clocked 180 degrees relative to the first laminate $12_1$ when it is added to the stack. A sixth laminate $12_6$ can be sequentially formed the same way as the second stator laminate $12_2$, but clocked 180 degrees relative to the second laminate $12_2$ when it is added to the stack. A seventh stator laminate $12_7$ can be sequentially formed the same way as the first stator laminate $12_1$, but clocked 270 degrees relative to the first laminate $12_1$ when it is added to the stack. An eighth laminate $12_8$ can be sequentially formed the same way as the second stator laminate $12_2$, but clocked 270 degrees relative to the second laminate $12_2$ when it is added to the stack. The formation of the ears 18 from different rotational locations and coordinated clocking of the sequence of stator laminates allows for smaller angular rotations of the laminations within the stack to distribute the thickness variation more uniformly throughout the full stack. Utilizing ear sets from 2, 3 or 4 different circumferential locations in the different stator laminations (i.e. 1 ear every 22.5, 30, 45, 60 degrees etc.) instead of the current design of stamping only 1 set of four ears at 90 degrees allows for smaller angular rotations of the laminations within the stack to distribute the thickness variations of the stator laminates 12 more uniformly throughout the full stack 10.

Figure 5:
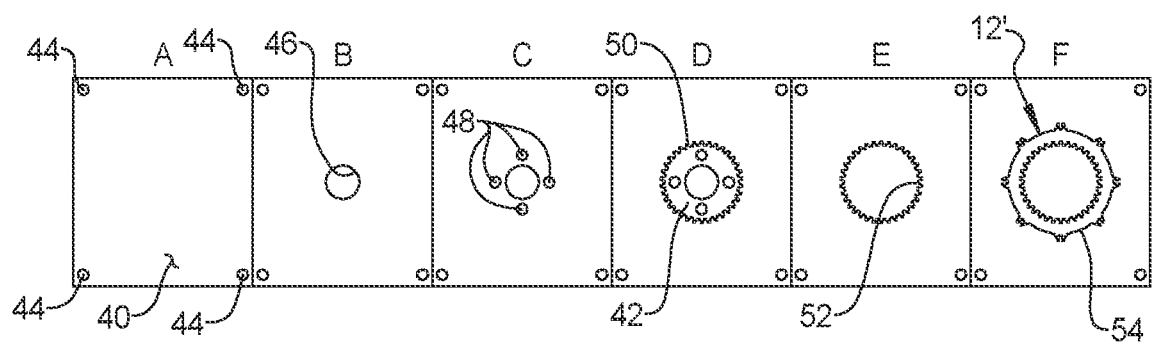
FIG. 5 illustrates an exemplary stamping sequence for the method of the present disclosure.

FIG. 5 illustrates an example progressive stamping operation on a continuous lamination strip 40 to generate first a rotor piece 42 and then the stator piece 12. A current progressive die uses round fixed cylindrical pilots to locate the sheet between die stages. However, using spring loaded taper pilots to locate the sheet between die stages, will control and improve the quality of the stack by minimizing the eccentricity and lamination shifting between the ID and the OD of the stator.

At a first stage A, the pilot holes 44 are punched out of the sheet using perfs. Then, at a second stage B a center perf will punch a rotor inside diameter hole 46. At a third stage C, four additional openings 48 are formed. At a fourth stage D, the rotor slots 50 on the outside diameter of the rotor are stamped and the rotor laminate 42 is removed. In a fifth stage E, the stator inside diameter slots 52 are punched. In a sixth step F, the outside diameter 54 of the preliminary stator laminate 12' is formed with two sets of ears 18a, 18b. As detailed above, alternate sets of the ears 18a, 18b are then removed from each subsequent preliminary stator laminate 12' to allow for smaller incremented clocking as detailed above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A method of forming a stack of laminates for a stator, comprising:
   stamping in sequence a plurality of preliminary annular stator laminates from a continuous sheet of metal, the preliminary annular stator laminates each including an interior surface with a plurality of winding teeth and an exterior surface with a plurality of sets of circumferentially spaced radially protruding ears;

trimming all but one of the sets of circumferentially spaced radially protruding ears from each preliminary annular stator laminate to form a plurality of annular stator laminates wherein each annular stator laminate has a remaining set of equally spaced radially protruding ears such that the remaining set of equally spaced radially protruding ears of each of the annular stator laminates is circumferentially offset from a remaining set of equally spaced radially protruding ears of immediately adjacent annular stator laminates; and clocking each of the annular stator laminates a predetermined angular rotation relative to an immediately adjacent annular stator laminate and stacking the annular stator laminates with each remaining set of equally spaced radially protruding ears aligned within the stack.

2. The method according to claim 1, wherein the plurality of sets of circumferentially spaced radially protruding ears include at least two sets of circumferentially spaced radially protruding ears and up to four sets of circumferentially spaced radially protruding ears.

3. The method according to claim 2, wherein the plurality of sets of circumferentially spaced radially protruding ears each include at least three circumferentially spaced radially protruding ears per set.

4. The method according to claim 1, wherein clocking each of the annular stator laminates a predetermined angular rotation relative to an adjacent annular stator includes clocking at least 22.5 degrees relative to an adjacent annular stator.

5. The method according to claim 1, wherein clocking each of the annular stator laminates a predetermined angular rotation relative to an adjacent annular stator includes clocking at least 30 degrees relative to an adjacent annular stator.

6. The method according to claim 1, wherein clocking each of the annular stator laminates a predetermined angular rotation relative to an adjacent annular stator includes clocking at least 45 degrees relative to an adjacent annular stator.

7. The method according to claim 1, wherein each of the plurality of sets of circumferentially spaced radially protruding ears include at least three ears.

8. The method according to claim 7, wherein each remaining set of circumferentially spaced radially protruding ears include at least four ears.

9. A method of forming a stack of laminates for a stator, comprising:

stamping in sequence a plurality of annular stator laminates from a continuous sheet of metal, the annular stator laminates each including an interior surface with a plurality of winding teeth and an exterior surface with a plurality of circumferentially spaced radially protruding ears, wherein the plurality of circumferentially spaced radially protruding ears of each annular stator laminate is circumferentially offset from the circumferentially spaced radially protruding ears of immediately adjacent annular stator laminates; and clocking each of the annular stator laminates a predetermined angular rotation relative to an adjacent annular stator laminate and stacking the annular stator laminates with the circumferentially spaced radially protruding ears aligned within the stack.

10. The method according to claim 9, wherein the plurality of circumferentially spaced radially protruding ears include at least three ears.

11. The method according to claim 9, wherein the plurality of circumferentially spaced radially protruding ears include at least four ears.

12. The method according to claim 9, wherein clocking each of the annular stator laminates a predetermined angular rotation relative to an adjacent annular stator includes clocking at least 22.5 degrees relative to an adjacent annular stator.

13. The method according to claim 9, wherein clocking each of the annular stator laminates a predetermined angular rotation relative to an adjacent annular stator includes clocking at least 30 degrees relative to an adjacent annular stator.

14. The method according to claim 9, wherein clocking each of the annular stator laminates a predetermined angular rotation relative to an adjacent annular stator includes clocking at least 45 degrees relative to an adjacent annular stator.

15. A stator laminate stack made according to the method claim 9.

16. A method of forming a stack of laminates for a stator, comprising:

stamping in sequence a plurality of annular stator laminates from a continuous sheet of metal, the annular stator laminates each including an interior surface with a plurality of winding teeth and an exterior surface with a plurality of circumferentially spaced radially protruding ears, wherein the plurality of circumferentially spaced radially protruding ears of each annular stator laminate is circumferentially offset from the circumferentially spaced radially protruding ears of immediately adjacent annular stator laminates; and clocking each of the annular stator laminates a predetermined angular rotation relative to an adjacent annular stator laminate and stacking the annular stator laminates with the circumferentially spaced radially protruding ears aligned within the stack, wherein a segmented blank/punch is used to blank the ears progressively at multiple locations on the perimeter of the stack of laminates.

17. The method according to claim 16, wherein the segmented blank/punch includes at least two sets of a plurality of punches.

18. The method according to claim 17, wherein the at least two sets of a plurality of punches each include at least three punches.

19. The method according to claim 18, wherein the at least three punches of a first set of the at least two sets of a plurality of punches are spaced at equal intervals from one another.

20. The method according to claim 19, wherein the at least three punches of a second set of the at least two sets of a plurality of punches are spaced at equal intervals from one another and spaced from the first set of the at least two sets of a plurality of punches.

* * * * *